United States Patent Office

3,507,611
Patented Apr. 21, 1970

3,507,611
RETARDING EVAPORATION
Harold D. Boultinghouse, Bartlesville, Okla., assignor to Phillips Petroleum Company, a corporation of Delaware
No Drawing. Filed Mar. 23, 1967, Ser. No. 625,320
Int. Cl. B01j 1/18
U.S. Cl. 21—60.5          9 Claims

ABSTRACT OF THE DISCLOSURE

Retarding evaporation losses by forming an evaporation barrier on surfaces subject to evaporation comprising:
(1) placing on the surface at least one particulate polymeric material having a buoyancy such that it floats on the surface and an inflamable substance, and igniting the inflammable substance so as to fuse the polymer and form said barrier, or
(2) placing on the surface a mixture containing a solvent and a radial block copolymer which forms a film on the surface upon evaporation of the solvent.

---

This invention relates to methods of applying an evaporation-retarding barrier or film on the surface of bodies of materials subject to evaporation or seepage losses, such as aqueous systems.

In another aspect, the invention relates to a method of retarding evaporation from the surface of aqueous bodies by adding thereto at least one particulate organic polymer having a density lower than the aqueous body so that the polymer will float and an inflammable substance, and then igniting the substance to fuse the polymer, thus forming an evaporation-retarding barrier or film on the surface of the water.

In another aspect, the invention relates to a method for retarding evaporation from the surface of bodies of fluids subject to evaporation losses by adding thereto a mixture of a volatile solvent and a sufficient amount of at least one radial block copolymer having sufficient buoyancy to float on the surface of the fluid to be protected, so that upon evaporation of the solvent an evaporation-retarding film forms on the surface.

In still another aspect, the invention relates to a method for retarding evaporation of aqueous systems comprising adding thereto a mixture comprising a volatile solvent, a thermoplastic organic polymer, and a sufficient amount of at least one radial block copolymer to form an evaporation-retarding film on the surface of the system upon evaporation of the solvent both the copolymer and the thermoplastic organic polymer having a density less than the aqueous system being protected from evaporation losses.

The loss of water for example by evaporation from open reservoirs is a serious problem throughout the world. The problem exists in parts of the United States which suffer from acute water shortages. Over 400 million dollars worth of water is lost annually in the United States because of evaporation from open reservoirs.

Certain coating methods for reducing loss by evaporation are already known. Addition of chemical treatments and oil films has been tried but both are unacceptable because of contamination caused by addition of such materials. Use of hydrocarbon componuds containing long hydrocarbon chains and a polar hydrophylic group such as alcohols and acids is also unsuitable because such materials disappear rapidly in large amounts primarily because of decomposition dilution or evaporation.

It is an object of this invention to reduce losses by evaporation or seepage losses from solids without requiring the use of chemical treating agents.

Another object is to provide a method for reducing evaporative loss from reservoirs, ponds, pools, and other areas where materials subject to evaporation are stored, at low cost and under conditions requiring minimum maintenance.

A specific object of the invention is to provide a method for reducing evaporative loss from storage areas by providing a coherent film on the surface thereof which is durable, inexpensive to apply, and does not contaminate the water.

Other aspects, objects, and advantages of this invention will be apparent from the disclosure and claims.

Broadly, the invention provides a method for producing a coherent, durable, evaporation-retarding film or barrier on the surface of materials, both liquid and solid, subject to evaporation or seepage losses, especially aqueous systems.

In one embodiment, evaporation or seepage from the surface of bodies of aqueous or other non-flammable materials is retarded by applying thereto at least one particulate thermoplastic, organic polymer having a buoyancy or density such that it floats on the surface and an inflammable substance, and then igniting the inflammable substance so as to fuse the polymer, thus forming an evaporation-retarding film or evaporation barrier on the surface of the material being protected from fluid losses due to evaporation or seepage.

In another embodiment, evaporation or seepage is retarded from the surface of bodies of materials subject to such losses by forming a coherent film on the surface thereof by a method which comprises applying to the material a mixture comprising a solvent, and a sufficient amount of at least one radial block copolymer having a buoyancy such that it floats on the surface of the material, whereby a coherent, evaporation-retarding film is formed on the surface upon evaporation of the solvent. Other thermoplastic organic polymers can be present in the mixture, provided there is sufficient radial block copolymer to form a coherent film on the surface upon evaporation of the solvent.

In the practice of the first embodiment, any suitable thermoplastic organic polymer or mixtures thereof can be used. For example, polymers of mono- alpha-olefins containing from 2 to 10, or more, carbon atoms can be used, such as the homopolymers and copolymers of ethylene, propylene, 1-butene, 1-hexene, 1-octene, and so on. Interpolymers of the mono- alpha-olefins with other polymerizable materials can also be used, among which are ethylene-vinylacetate, ethylene-methylacrylate, ethyleneacrylic acid copolymer, ethylene-methylmethacrylate, ethlene-vinylidene chloride, ethylene-vinyl chloride, and so on. Further homopolymers of other polymerizable materials can also be used, including polyvinylchloride, polyvinylidene chloride, copolymers of vinyl chloride with vinyl acetate or vinylidene acetate.

The particulate thermoplastic organic polymers used in the first embodiment can have various shapes and sizes. The shape of the solid plastic particles should be such that the particles themselves do not "pile-up" upon one another. Spheres, cylinders, cubes, ovoid shapes, and so on, are acceptable. As examples, pellets having dimensions of about 1/8–5/8 inch are practical as are 1/8–1/4 inch spherical shapes. In addition, the particles can be foamed for greater buoyancy.

Among the suitable flammable materials which can be used are gasoline, kerosene-type fuels, and aromatics such as benzene, and toluene. Lighter fluid compositions are also acceptable. Sufficient amounts of the inflammable substance should be present to provide sufficient heat upon ignition to fuse the polymer. Thus, amounts of the inflammable substances from 0.05 to 0.5 percent by weight of the polymer can be used, although amounts outside this range can also be used. These substances can be pre-mixed with the polymer before addition to the surface, or can be added separately.

Any suitable method for adding the thermoplastic particulate polymers and inflammable material to the water can be used. For example, it can be manually broadcast from a slow moving boat or released from a storage bin attached to a float or boat through a suitable distributor head.

In practicing the second embodiment of the invention, the solvent used should be sufficiently volatile to evaporate soon after adding the mixture to the water; for example, elapsed time can vary from 5 minutes to 7 hours. Aromatic substances are particularly suited for this purpose, examples of which are benzene, toluene, the xylenes, and mixtures thereof. A sufficient amount of the solvent is used to completely dissolve the polymers which form the film. Solutions containing 0.2–8 weight percent polymer, preferably 0.8–5 weight percent, are satisfactory for forming tough films upon evaporation of solvent.

As disclosed above, sufficient amounts of at least one radial block copolymer having a density lower than the fluid to be protected from fluid evaporation losses, or seepage losses, in the case of solids, are used in the film-forming mixture. The preparation and characteristics of these copolymers are set forth in U.S. Patent No. 3,281,383, to Robert P. Zelinski and Henry L. Hsieh, which issued Oct. 25, 1966. As disclosed therein, a branched polymer is prepared by polymerizing conjugated dienes or vinylidene-substituted aromatic compounds in the presence of an organo-monolithium initiator to produce a polymer which contains an active lithium atom or one end of the polymer chain. This lithium-terminated polymer is then reacted with a compound having at least three reactive sites capable of reacting with the carbon-lithium bond and adding to the carbon possessing this bond in the polymer. The result is a polymer having relatively long branches which radiate from a nucleus formed by the polyfunctional compound which reacts with the lithium-terminated polymer. For convenience, these polymers are denoted "radial" polymers.

Conjugated dienes used to make the copolymer contain from 4 to 12 carbon atoms per molecule, although those containing from 4 to 8 carbon atoms are preferred. Examples of such compounds include 1,3-butadiene, isoprene, 2,3-dimethyl-1,3-butadiene, piperylene, 3-butyl-1,3-octadiene, phenyl-1, 3-butadiene, and the like. The vinyl-substituted aromatic compounds include styrene, 1-vinylnaphthylene, 2-vinylnaphthylene, and the alkyl, cycloalkyl, aryl, alkaryl, and aralkyl derivatives thereof in which the total number of carbon atoms in the combined substituent is generally not greater than 12. Examples of such substituted monomers include 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, and the like. The conjugated dienes in the vinyl-substituted aromatic compounds can be polymerized alone or in admixture with one another to form homopolymers, copolymers, or block copolymers.

Other thermoplastic organic polymers in particulate form can be used in admixture with the radial block copolymers provided that there is sufficient radial block copolymer to produce a coherent film upon evaporation of the solvent. Additional thermoplastic organic polymers which can be used are disclosed above in reference to the first embodiment of the invention; they must have a density no greater than one gram per cc.

The methods of adding the mixture to water described with reference to the second embodiment are the same as those described with reference to the first embodiment. This mixture is sprayed on or released from a trickler tank from the shore or a slow moving boat.

EXAMPLE

To demonstrate the effectiveness of the two embodiments of this invention, tests were made in an air-conditioned room at about 70–77° F. As the data in Table I, below, show, the two embodiments of this invention produced substantial reduction of water loss as compared to the control run, in which no coating was applied to the water surface, and as compared to the second control run, in which unfused, particle-form polymer was used to retard evaporation from the water surface.

TABLE I

| Container | Wt. of water (g.) Initial | Wt. of water (g.) Final | Percent saved over control |
| --- | --- | --- | --- |
| Open jar | 600 | 103 | |
| Particles, floating, unfused | 600 | 153 | 33 |
| Cast film and particles | 600 | 203 | 51 |
| Fused particles | 600 | 203 | 51 |

The second jar sample was covered with 27.6 g. of polyethylene pellets, density .950, containing 5 percent carbon black pigment, ⅛ inch long.

The third jar was prepared by dissolving 5 g. radial block in 25 ml. toluene. This mixture was poured on the surface of the water and the toluene was allowed to evaporate. Before the film had been completely formed, 20 g. of the type of pellets used in jar 2 was cast on the film.

The fourth sample was prepared by wetting 26 g. of pellets (density 950, 5 percent carbon black, ⅛ inch long) with 10 ml. lighter fluid. These were cast on the water and the fluid ignited. A fused layer of pellets formed on the surface.

The containers were kept for 3 weeks in a room air conditioned at about 76° F. and 65 percent relative humidity. Initial weight of water and final weight of water were determined to 0.1 g. The figures in the table were rounded off to the nearest gram.

I claim:

1. A method of retarding evaporation from surfaces of bodies of non-flammable fluids subject to evaporation losses comprising adding to the fluid at least one particulate thermoplastic organic polymer having a buoyancy such that it floats on the surface and an inflammable substance, and then igniting said substance to fuse said polymer to form an evaporation-retarding film or barrier on the surface of the fluid.

2. The method of claim 1 wherein said inflammable substance is present in an amount sufficient to fuse said polymer upon ignition of said substance.

3. The method of claim 2 wherein said inflammable substance is present in an amount of from 0.05 to 0.5 percent by weight of said polymer.

4. The method of claim 1 wherein said polymer is selected from homo- and co-polymers of mono- alpha-olefins, and copolymers of mono- alpha-olefins with at least one different polymerizable substance.

5. The method of claim 1 wherein said inflammable substance is selected from kerosene, gasoline, and aromatic compounds.

6. A method of retarding surface evaporation losses from bodies of aqueous fluids subject to evaporation comprising adding thereto a mixture comprising a volatile solvent insoluble in aqueous fluids, and a sufficient amount of at least one radial block copolymer insoluble in aqueous fluids and having sufficient buoyancy to float on the surface of said aqueous fluids dissolved in said solvent which, upon evaporation of said volatile solvent, forms an evaporation-retarding coherent and durable membranous rubber film of said copolymer of appreciable thickness on the surface of the aqueous fluid.

7. The method of claim 6 wherein said solvent is selected from benzene, toluene, the xylenes, and mixtures thereof, and wherein the amount of polymer dissolved in said solvent ranges from 0.2 to 8 weight percent polymer.

8. The method of claim 7 wherein said solvent is present in an amount sufficient to dissolve said copolymer and said organic polymer completely.

9. The method of claim 6 wherein said mixture further comprises at least one organic polymer different from said radial block copolymer.

References Cited

UNITED STATES PATENTS

| | | | |
|---|---|---|---|
| 2,562,373 | 7/1951 | Arnold | 264—298 XR |
| 2,631,334 | 3/1953 | Bailey | 264—298 |
| 2,689,187 | 9/1954 | Thomsen | 264—298 |
| 3,031,721 | 5/1962 | Friedlander | 264—298 |
| 3,147,067 | 9/1964 | Salyer | 21—60.5 |
| 3,281,383 | 10/1966 | Zelinski & Hsieh | 260—23.7 |
| 3,421,838 | 1/1969 | Hellings | 21—60.5 |

FOREIGN PATENTS 224,416  10/1959  Australia.

MORRIS O. WOLK, Primary Examiner

DENNIS G. MILLMAN, Assistant Examiner